Patented June 12, 1945

2,377,878

UNITED STATES PATENT OFFICE 2,377,878

DIOXOLANE-ACID HALIDE REACTION AND PRODUCT

William Franklin Gresham, Wilmington, Del., assignor to E. I. du Pont de Nemours & Company, Wilmington, Del., a corporation of Delaware No Drawing. Application December 24, 1941, Serial No. 424,293

6 Claims. (Cl. 260—488)

This invention relates to a process for the preparation of high molecular weight organic compounds and more particularly to their preparation from 1,3-dioxolane and acid halides. It likewise relates to the resulting products.

The present invention provides new reaction products obtainable from the reaction of 1,3-dioxolane with other organic compounds. Another object of the invention is to provide new compositions of matter from 1,3-dioxolane or its substitution products and acid halides. Yet another object is to provide a process for the interaction of 1,3-dioxolane and its substitution products with acid halides in the presence of an acidic type catalyst. Another object is to provide reaction conditions and catalysts for such reactions, whereby valuable products are obtainable. Other objects and advantages of the invention will hereinafter appear.

Valuable products are obtained in accord with the invention by reacting 1,3-dioxolane, substituted 1,3-dioxolane, or reactants which form these compounds with acid halides which include, for example, the monocarboxylic acyl halides, RCO-halogen, and more especially the acyl chlorides having the formula RCOCl in which R is a monovalent alkyl, aryl, aralkyl, cyclic, or alicyclic group such as:

Acetyl chloride,
Propionyl chloride,
Butyryl chloride,
Valyryl chloride,
Benzoyl chloride,
Toluoyl chloride, the mono and poly acid halides of the polycarboxylic acids having the formula R(CO)$_x$(halogen)$_x$ in which R is a polyvalent alkyl, aryl, aralkyl, cyclic or alicyclic group and $x$ is a positive integer greater than 1, and more especially acid halides such as:

Oxalyl chloride,
Malonyl chloride,
Succinyl chloride,
Glutaryl chloride, and similar substituted and unsubstituted, acyl chlorides, bromides, iodides, and fluorides.

The products of the invention are of relatively high molecular weight, a number of which contain at least one 1,3-dioxolane (or substituted 1,3-dioxolane) residue, and at least one residue of the acid halide with a minimum of at least three residues; for example, the compounds resulting from the reaction of 1,3-dioxolane with acetyl chloride will contain at least one 1,3-dioxolane residue as —CH$_2$OCH$_2$CH$_2$O—, with a minimum of three residues, two of which are similar. The polymer-like compounds of the invention are believed to be primarily linear in form, although cyclic forms may be present.

The acyl halides may be reacted in accord with the procedural details more fully particularized hereinafter, with 1,3-dioxolane and its substitution products. 1,3-dioxolane has the chemical formula with numbering as shown:

and may be obtained by reacting formaldehyde or a formal with ethylene glycol. Products with substituents in the 2 position can be readily obtained by reaction of ketones or other aldehydes either aliphatic or aromatic with ethylene glycol. Thus, by way of example, many compounds are obtained which may be employed in accord with the invention, such as 2-methyl-1,3-dioxolane,
2-ethyl-1,3-dioxolane,
2,2-dimethyl-1,3-dioxolane,
2,2-diethyl-1,3-dioxolane,
2-phenyl-1,3-dioxolane,
2,2-methylphenyl-1,3-dioxolane, and higher dioxolanes substituted in like manner which may, for example, be obtained from ethylene glycol and acetaldehyde, propanal, acetone, diethyl ketone, benzaldehyde, methyl phenyl ketone, and higher substituted aldehydes respectively. The invention likewise contemplates the use of dioxolanes substituted in the 4 and/or 5 positions. These dioxolanes are obtained by the interaction of substituted 1,2-glycols with aldehydes, for example, 1,2-propylene glycol plus formaldehyde will give 4-methyl-1,3-dioxolane and similarly the following dioxolanes can be readily prepared from formaldehyde and the corresponding glycols:

4-ethyl-1,3-dioxolane,
4-propyl-1,3-dioxolane,
4,5-dimethyl-1,3-dioxolane.

In lieu of 1,3-dioxolane, reactants may be used which form 1,3-dioxolane and in such reactions there would be present the acyl halide to be reacted together with, for example, formaldehyde and ethylene glycol, methylal and ethylene glycol, or other reactants which will form 1,3-dioxolane.

Valuable compounds are obtainable by the reaction of small amounts of 1,3-dioxolane or its derivatives with large amounts of the acid halide, that is, in the order of 1–100 and the reverse is also true. The greater the amount of 1,3-dioxolane present, the greater becomes the viscosity of the compounds until solids are eventually produced, while contrariwise, the greater the ratio of the acid halide the less viscous will be the resulting compound. There appears to be no limiting factor restricting the proportion of reactants.

The reaction between the 1,3-dioxolane and the acid halide is effected at temperatures ranging between −80 and 300° and preferably between 0 and 150° C. Atmospheric, sub- or super-atmospheric pressures may be used and, if the last, pressure may range between 1 and 1000 atmospheres or higher. Normally excellent results are obtained at or about atmospheric pressure. If desired, the temperature of the reaction, especially when it is carried out at the boiling point of the reaction mixture, may be controlled by varying the pressure on the boiling reactants.

The lower molecular weight acyl halides react vigorously with the dioxolanes; as the molecular weight of the acyl halides increases, however, the reaction tapers off and, if desired, catalysts may be used to accelerate it. Acidic type catalysts may be used such, for example, as sulfuric acid, phosphoric acid; the halogen acids, such as hydrochloric, hydrofluoric acid (alone or with $BF_3$); boron fluoride (including its complexes with water, acids, esters, alcohols, and the like), paratoluene sulfonic acid, camphor sulfonic acid, and other acid catalysts of this general nature. Friedel-Crafts type catalysts other than $BF_3$ may be used, such as $AlCl_3$, $AlBr_3$, $FeCl_3$, and so forth, as well as inorganic acids generally and their salts such as sodium acid sulfate, sodium acid phosphate, and so forth.

The catalyst may be supported or not on inert supports such as charcoal, silica gel (which alone is a catalyst for the reaction), kieselguhr, and so forth. Concentrations of $BF_3$, $H_2SO_4$ and similarly strong catalysts may be extremely low; less than 0.1%, and amounts down to as low as 0.001% of the strong acid catalyst have been found sufficient to give products although high concentrations of the catalyst even equal to or greater than the weight of the dioxolane are likewise satisfactory.

The reaction is preferably continued approximately to equilibrium in order to obtain the above defined organic compounds. The reaction may then be stopped by destroying the catalyst. This may be done by removing it (in the case of silica gel, kieselguhr, and the like) or by treating the reaction mixture with an inorganic base, such as ammonia, alkali metal, and alkaline earth metal hydroxides, carbonates, alkoxides, and so forth or an organic base, such as pyridine, dimethylamine, and the like. These bases are added in sufficient amounts to neutralize the catalyst when acid catalysts are used, and the unconverted reactants may be removed by distillation under reduced pressures. As soon as the catalyst has been neutralized, the reaction ceases. The neutralized catalyst may be filtered off and the product which remains treated for the recovery of the desired products.

In the reaction of the dioxolanes with the acid halides and more especially when the higher molecular weight products are being prepared there usually will be found in the reaction mixture along with the desired product unreacted dioxolane and the acid halide together with by-products. It is possible to inhibit the formation of the undesired products by carrying out the process in an intermittent or continuous manner whereby the desired product is withdrawn from the reaction zone and the undesirable products, after being separated therefrom, are returned to the reaction zone. By this means it is possible to obtain high yields of the desired product.

In addition to being instrumental in stopping the reaction at the desired point, the neutralization of the catalyst tends to stabilize the high molecular weight products. It follows, therefore, that for high temperature uses no acid should be present. They should preferably be neutral or on the alkaline side.

Examples will now be given illustrating embodiments of the invention but it will be understood that it will not be limited by the details thereof. Parts are by weight unless otherwise indicated.

*Example 1.*—22 parts of 4-methyl-1,3-dioxolane was added to and thoroughly mixed with 19.3 parts of acetyl chloride. After approximately one minute a fairly rapid, exothermic, reaction set in. When this reaction subsided, the mixture was heated on the steam bath for two hours and then distilled under reduced pressure. 31.4 parts of $\alpha$-methyl-$\beta$-chloromethoxyethyl acetate ($CH_3COOCHCH_3CH_2OCH_2Cl$), B. P. 55° C./2 mm., was obtained. Analysis gave: saponification No. 678, Cl 20.0%; calculated, saponification No. 675, Cl 21.2%.

*Example 2.*—78 parts of acetyl chloride and 111 parts of 1,3-dioxolane were reacted in accord with the details of Example 1 and gave 150 parts of ($\beta$-chloromethoxy) ethyl acetate

$$(CH_3COOCH_2CH_2OCH_2Cl)$$

B. P. ca. 68° C./4 mm. Saponification No. 739; calculated, 733.

*Example 3.*—A reaction mixture consisting of 39.3 parts of acetyl chloride, 370 parts of 1,3-dioxolane and 1 part of sulfuric acid was heated under a reflux condenser for 5 hours. The cooled product was treated with 0.9 part of sodium hydroxide in ca. 2 parts of water and then stripped of low boiling materials by heating finally to 100° C. under 1 mm. pressure. This gave 316 parts of a viscous liquid high molecular weight product.

*Example 4.*—A mixture consisting of 26 parts of 2-methyl butane diol-1,3-cyclic formal and 19.5 parts of acetyl chloride containing a trace of hydrogen chloride was heated on a steam bath for from 3 to 4 hours and then distilled. The major reaction product found in 89% conversion was a clear, colorless, water-insoluble, acetone- and methanol-soluble liquid having a boiling point between 65 and 70° C. at 1 to 2 mm.

The high molecular weight products hereinbefore described may be used as intermediates for syntheses of other products such as amines, ethers, acids, and so forth; as shrink proofing, softening, crinkle proofing, and swelling agents for textiles and yarns; as mercerizing assistants and dye assistants; as plasticizers for resins, cellulose derivatives, gums, proteins, cork, and so forth; as solvents for gums, resins and lacquers; as possible rodent poisons; as surface active agents or intermediates for surface active agents; as ingredients in rubber or rubber substitutes to improve oil resistant properties; as linking agents for textiles, resins; and as penetrants in flame proofing materials.

I claim:

1. A process for the preparation of a compound selected from the group consisting of (beta-chlormethoxy) ethyl acetate and alpha-methyl-beta-(chlormethoxy) ethyl acetate which comprises mixing a compound selected from the group consisting of 1,3-dioxolane and 4-methyl 1,3 dioxolane with acetyl chloride, heating the resulting mixture after the initial exothermic reaction has subsided and subsequently recovering the resulting ester.

2. An aliphatic organic acid ester selected from the group consisting of (beta-chlormethoxy) ethyl acetate and alpha-methyl-beta-(chlormethoxy) ethyl acetate.

3. A process for the preparation of α-methyl-β-chloromethoxyethyl acetate which comprises reacting a composition containing approximately 22 parts of 4-methyl-1,3-dioxolane with 19.3 parts of acetyl chloride, heating the reaction mixture after the initial exothermic reaction has subsided for approximately 2 hours on a steam bath and subsequently recovering the alpha-methyl-β-chloromethoxyethyl acetate by distillation.

4. A process for the preparation of (β-chloromethoxy) ethyl acetate which comprises reacting a mixture of approximately the composition 78 parts of acetyl chloride and 111 parts of 1,3-dioxolane and after the initial exothermic reaction has subsided, heating the reaction mixture on a steam bath for approximately 2 hours, and subsequently recovering the (β-chloromethoxy) ethyl acetate from the reaction products by distillation.

5. Alpha - methyl - beta - chloromethoxyethyl acetate,

boiling point 55° C. at 2 mm.

6. (Beta - c h l o r o m e t h o x y) ethyl acetate, $CH_3COOCH_2CH_2OCH_2Cl$, boiling point 68° C., at 4 mm.

WILLIAM FRANKLIN GRESHAM.